Nov. 29, 1949     O. L. SWANSON     2,489,597
MEASURING DVICE

Filed Oct. 8, 1946     2 Sheets-Sheet 1

INVENTOR.
Oscar L. Swanson
BY *Florian G. Miller*
Atty.

Nov. 29, 1949   O. L. SWANSON   2,489,597
MEASURING DVICE

Filed Oct. 8, 1946   2 Sheets-Sheet 2

INVENTOR.
Oscar L. Swanson
BY
Florian D. Miller
Atty.

Patented Nov. 29, 1949

2,489,597

UNITED STATES PATENT OFFICE 2,489,597

MEASURING DEVICE

Oscar L. Swanson, Erie, Pa.

Application October 8, 1946, Serial No. 701,919

8 Claims. (Cl. 33—174)

This invention relates generally to measuring devices and more particularly to measuring devices for determining the concentricity of a plurality of outside and inside diameters of a cylindrical workpiece.

In determining the concentricity of a cylindrical workpiece with several outside diameters and bores in the ends thereof, it has heretofore been necessary to provide makeshift devices for supporting the workpiece on a face plate and then try to determine the concentricity of the different surfaces by the uses of surface gauges, measuring blocks and the like. This has been very unsatisfactory and a great amount of time is necessary at the present time to set up each job for measurement. When a great number of these pieces are to be measured, the measuring operation is a major operation in a production schedule which greatly increases the cost of production. A particularly skilled workman is now necessary to set up the workpiece and measure the concentricity of the different surfaces thereof.

It is, accordingly, an object of my invention to provide a measuring device for measuring the concentricity of a plurality of surfaces on a cylindrical workpiece including end bores therein which is simple in construction, economical in cost, economical in manufacture, and efficient in operation.

Another object of my invention is to provide a measuring device for determining the concentricity of different diameters on a cylindrical workpiece and the end bores therein which is longitudinally adjustable to provide for varying lengths of workpieces and vertically adjustable to provide for varying diameters of workpieces.

Another object of my invention is to provide novel indicating means on a vertically movable V-shaped support in which compensation is made in accordance with the angle of the V-shaped support.

Other objects of my invention will become evident from the following detailed description, taken in conjunction with the accompanying drawings, in which Fig. 1 is a plan view of my novel measuring device;

Figure 1:
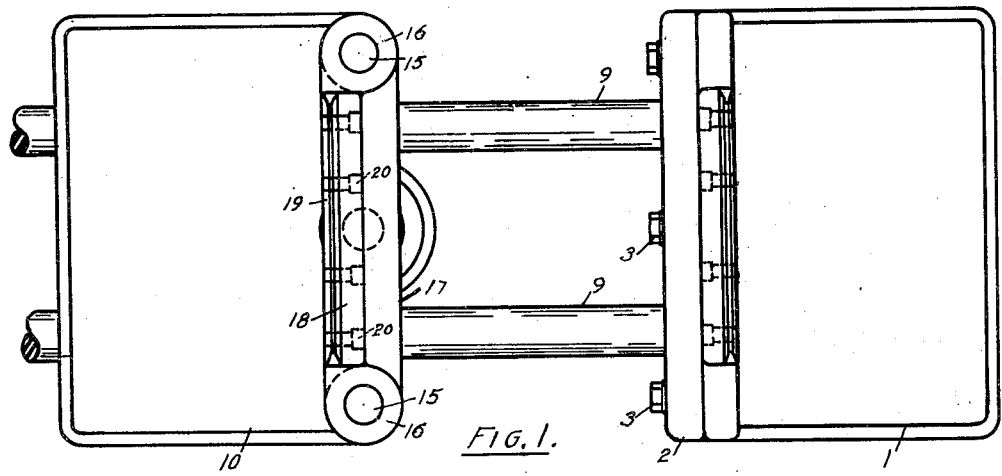

Referring now to the drawings, Figs. 1 to 5, inclusive, show a fixed table 1 having a vertically extending support member 2 secured to the end thereof by screw bolts 3. The support member 2 has a V-shaped supporting jaw 4 to which is attached V-shaped blades 5 by screw bolts 6. Apertures 7 in the lower part of the support 2 are aligned with apertured bosses 8 integral with the table 1 and receive horizontally extending parallel guide bars 9. The guide bars 9 are secured in the apertures 7 and 8 by pressing or by any other suitable means. A movable table 10 has apertures 11 and 12 and apertured bosses 13 for receiving guide bars 9 for longitudinal movement thereon. The movable table 10 has vertically extending apertures 14 for receiving vertically extending guide bars 15, the guide bars 15 receiving apertured ends 16 of a support member 17 having a V-shaped jaw portion 18 centrally thereof. The guide bars 15 may be secured to the movable table 10 or the support member 17 without departing from my invention. Blades 19 are attached to the V-shaped jaw portion 18 of the support member 17 by screw bolts 20. The table 10 has a centrally disposed aperture 22 for receiving a flanged bushing 23 secured to the table 10 by screw bolts 24. The flanged bushing 23 has a threaded portion 25 for threadably engaging the threaded portion 26 of a threaded lifting member 27 having horizontal indicating lines 28, circumferential indicating lines 29, and a knurled finger gripping portion 30 on the upper end thereof. The knurled portion 30 of the member 27 engages a pad 32 set in recessed portion 33 in the support member 17. The lead of the threads 26 on the member 27 and indicating portions 28 and 29 thereof are designed so that the vertical height of a work piece on the V-shaped support member or blades 19 may be determined. Short legs 40 are disposed on the table 10 and legs 41 and 42 are disposed on the support 2 to provide three-point suspension for the tables 1 and 10.

Figure 2:
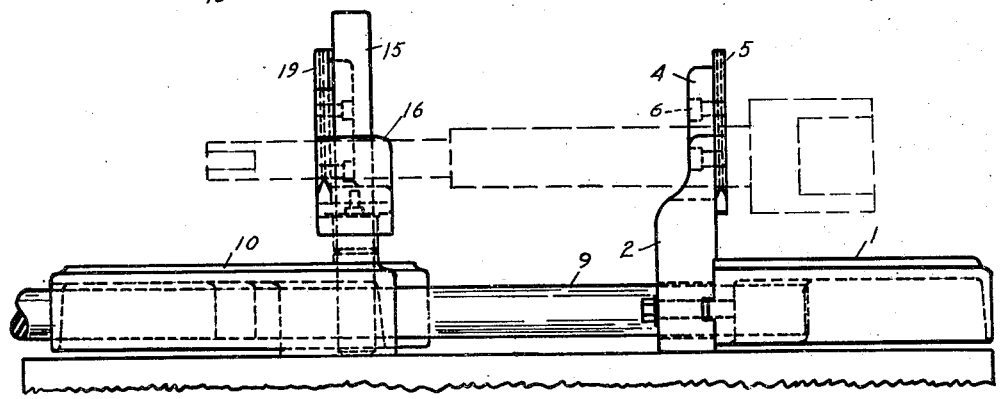
Fig. 2 is a side elevational view of my novel measuring device.
Figure 3:
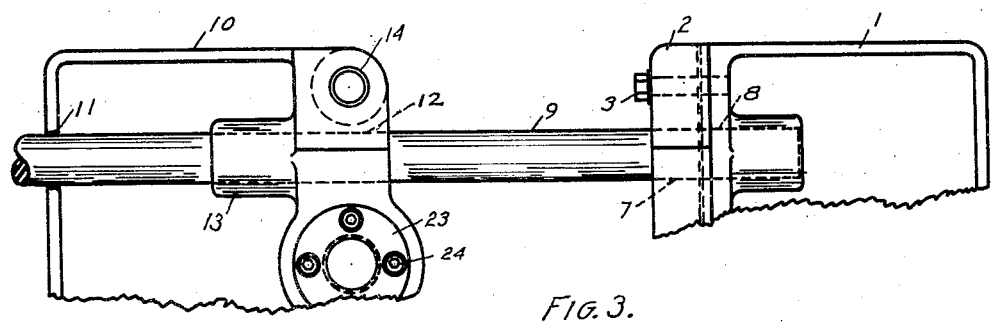
Fig. 3 is a fragmentary view of the bottom side of my novel measuring device.
Figure 4:
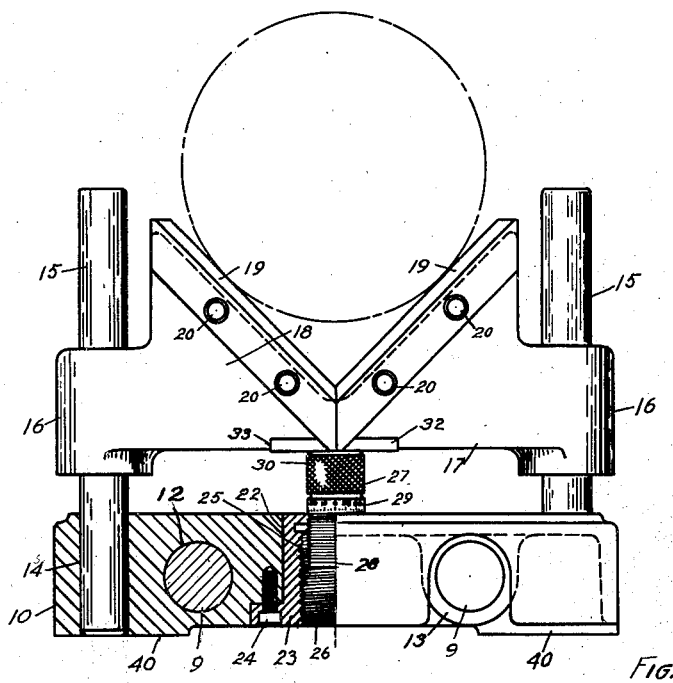
Fig. 4 is a side elevational view with parts broken away showing my novel adjustable support with the indicating means for determining the amount of vertical movement thereof.
Figure 5:
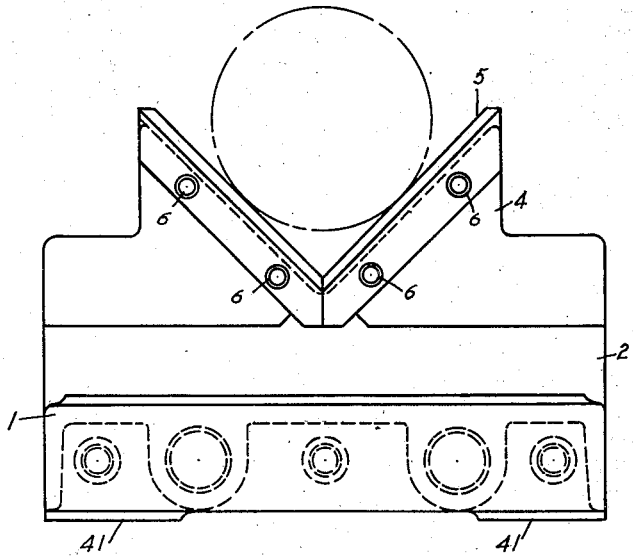
Fig. 5 is an end elevational view of my novel measuring device taken from the fixed end thereof.

I will describe the operation of my invention with particular reference to Fig. 2, although any other cylindrical workpiece may be accommodated. One of the larger diameters of the work piece is disposed in the V-shaped blades 5 in the fixed support 2 and a smaller diameter of the work piece is disposed on the adjustable V-shaped blades 19 of the support 17 as shown in Fig. 2. The table 10 is moved longitudinally to provide for the varying lengths of work pieces. Working with the known diameter of the small end of the work piece, the member 27 is rotated until indications 28 and 29 thereon show that the support 17 is raised to the point where the axis of the work piece should be absolutely parallel with the top of the work tables 1 and 10. Surface gauges, measuring blocks, or any other suitable measuring instruments or devices may be used on the tables 1 and 10 and/or on a face plate (not shown) on which the measuring device is mounted to determine the concentricity of the different inside and outside diameters of the work piece. End bores, counterbores, and all outside diameters may be measured for concentricity with my novel device.

It will be evident from the foregoing description that I have provided a novel measuring device for determining the concentricity of a plurality of diameters of a cylindrical work piece and also to determine the concentricity of end bores and counterbores therein which may be adjusted to provide for quick measurement of various lengths of work pieces and various diameters of work pieces, and which may be utilized by semi-skilled workmen and still obtain perfect measurements in a minimum of time. I have also provided a means for measuring concentricity of the different inside and outside diameters of a work piece which requires no initial set-up, which is portable, and which is simple and highly efficient.

Various changes may be made in the specific embodiment of my invention without departing from the spirit thereof, or from the scope of the appended claims.

What I claim is:

1. A portable precision measuring device comprising a table, a V-shaped support on one side of said table, guide members extending outwardly from said table, a second table movable on said guide members in parallel relationship to first mentioned table, a vertically adjustable, V-shaped support on the side of said movable table adjacent to the support on said first mentioned table, said supports being in alignment with each other, means for moving said adjustable support on said movable table vertically and means for indicating the amount of vertical movement of said adjustable support.

2. A portable precision measuring device comprising a fixed table, a V-shaped support on said table, parallel guide bars extending outwardly from said table, a second table movable on said guide bars, an adjustable V-shaped support movable vertically on said second table in alignment with said V-shaped support and said first mentioned table, means for moving said adjustable support vertically, and means for indicating the vertical movement of said adjustable support.

3. A portable precision measuring device as set forth in claim 2 wherein vertically extending guide bars are provided for steadying said adjustable support upon vertical movement thereof.

4. A precision measuring device comprising a fixed table, a vertically extending V-shaped support member attached to said table, guide bars parallel to each other extending outwardly from said table, a second table movable on said guide bars, a vertically adjustable V-shaped support member in alignment with the vertically extending V-shaped support member on said first mentioned table, means for moving said support member vertically, and indicating means for measuring the amount of movement of said adjustable support.

5. A precision measuring device as set forth in claim 4 wherein the top surfaces of said tables are in the same horizontal plane.

6. A precision measuring device as set forth in claim 4 wherein said adjustable support member on said second table comprises a V-shaped saddle, guide bars for said saddle, and a vertically extending screw member for moving said saddle vertically on said guide bars.

7. A precision measuring device as set forth in claim 4 wherein said vertically adjustable support member on said second table comprises a vertically movable saddle having a V-shaped support portion, guide means for said saddle, and a vertically extending screw member having a finger-gripping portion and having calibrations thereon for indicating the amount of movement of said saddle vertically on said guide means.

8. A precision measuring device as set forth in claim 4 wherein legs are disposed beneath said support member for elevating said tables.

OSCAR L. SWANSON.

REFERENCES CITED

The following references are of record in the file of this patent:

UNITED STATES PATENTS

| Number | Name | Date |
| --- | --- | --- |
| 410,414 | Hall, Sr. | Sept. 3, 1889 |
| 878,439 | Wagniere | Feb. 4, 1908 |
| 1,339,448 | Forsman et al. | May 11, 1920 |
| 1,350,119 | Staley | Aug. 17, 1920 |
| 1,585,490 | Hainsworth | May 18, 1926 |
| 1,938,216 | Damerell | Dec. 5, 1933 |
| 1,940,910 | Hickey | Dec. 26, 1933 |

OTHER REFERENCES

Aviation, June 1945, p. 156.